(12) United States Patent
Sessions

(10) Patent No.: US 6,606,576 B2
(45) Date of Patent: Aug. 12, 2003

(54) REAL-TIME CHANNEL CALIBRATION METHOD AND ARRANGEMENT

(75) Inventor: D. C. Sessions, Phoenix, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 154 days.

(21) Appl. No.: 09/766,308

(22) Filed: Jan. 19, 2001

(65) Prior Publication Data

US 2002/0138224 A1 Sep. 26, 2002

(51) Int. Cl.$^7$ ................................................ G01D 18/00
(52) U.S. Cl. ........................................................ 702/107
(58) Field of Search .............................. 702/107, 117; 318/611; 712/22; 710/52; 359/152; 324/142, 99; 455/116, 232; 330/254

(56) References Cited

U.S. PATENT DOCUMENTS

| | | | | | |
|---|---|---|---|---|---|
| 4,933,633 | A | * | 6/1990 | Allgood ........................ | 324/142 |
| 5,355,492 | A | * | 10/1994 | Frankel et al. ................. | 712/22 |
| 5,541,486 | A | * | 7/1996 | Zoller et al. .................. | 318/611 |
| 5,710,780 | A | * | 1/1998 | Thiruvengadam ........... | 702/117 |
| 6,175,434 | B1 | * | 1/2001 | Feng ........................... | 359/152 |
| 6,195,739 | B1 | * | 2/2001 | Wright et al. ................. | 710/52 |

OTHER PUBLICATIONS

Hendrickson, Norm, Schmitt, Andrew, and Dru, Matthew, *SFI–5 proposal for a 40Gb/s interface*, Vitesse Semiconductor, Jan. 2001.

* cited by examiner

*Primary Examiner*—John Barlow
*Assistant Examiner*—Tung S Lau
(74) *Attorney, Agent, or Firm*—Peter Zawilski

(57) ABSTRACT

A method and arrangement of transferring data at high speeds over a parallel data bus provides for calibration of the data without interrupting the data communication. Consistent with one aspect of the present invention, a method of parallel data communication is provided for a circuit arrangement including a parallel arrangement of data paths for passing data in parallel between at least two nodes. The method compares a sequence of data over an additional calibration/spare path relative to a matched sequence of data being passed on one of the multiple paths. In response to detecting skewed data, the transmission time for the subject path is adjusted in response to the comparison. Other example aspects of the invention are directed to procedures for rotating the calibration procedure through each of the data paths while using the spare to maintain communication integrity, and various embodiments for controlling the calibration procedure and for detecting whether the data is skewed.

24 Claims, 5 Drawing Sheets

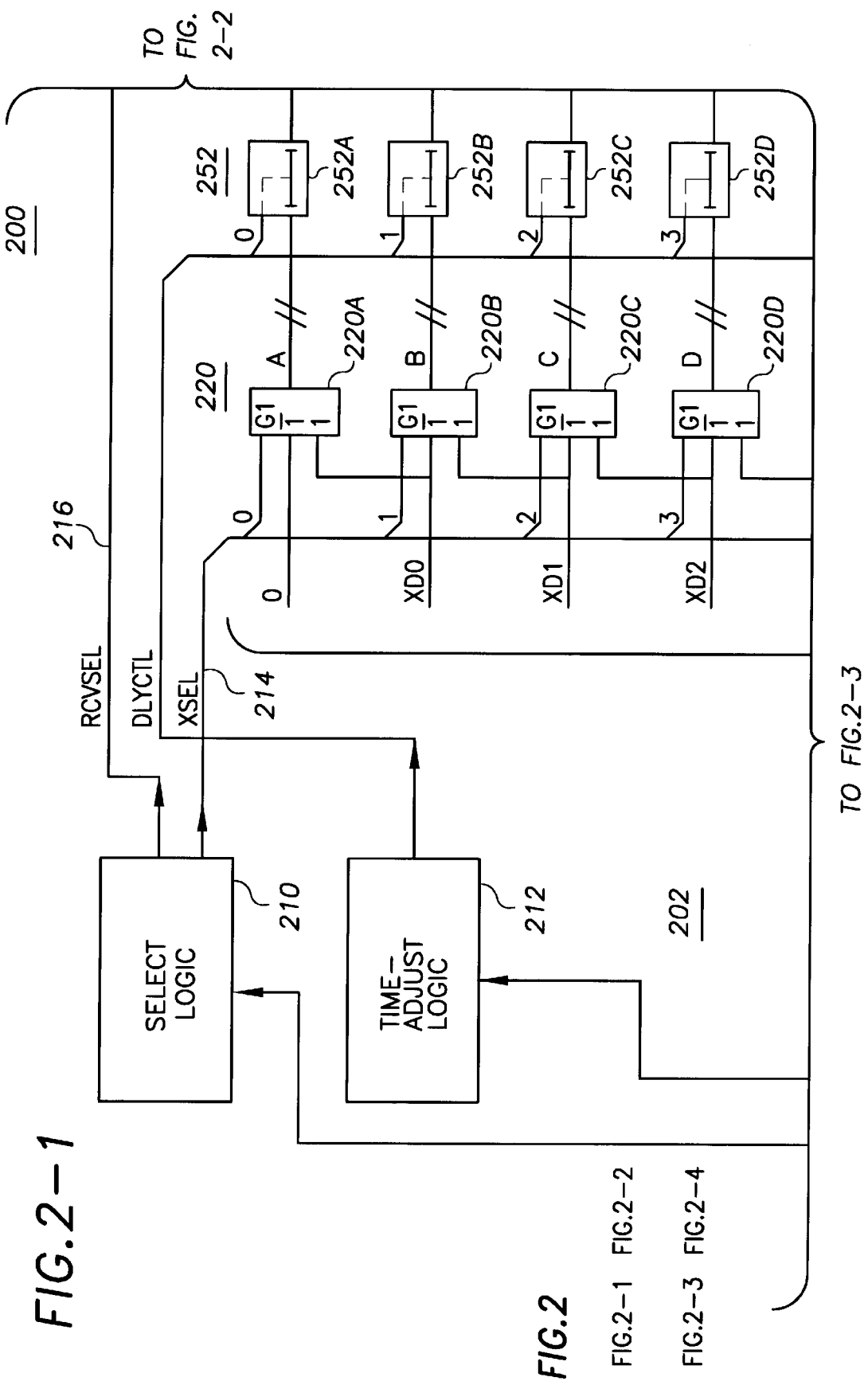

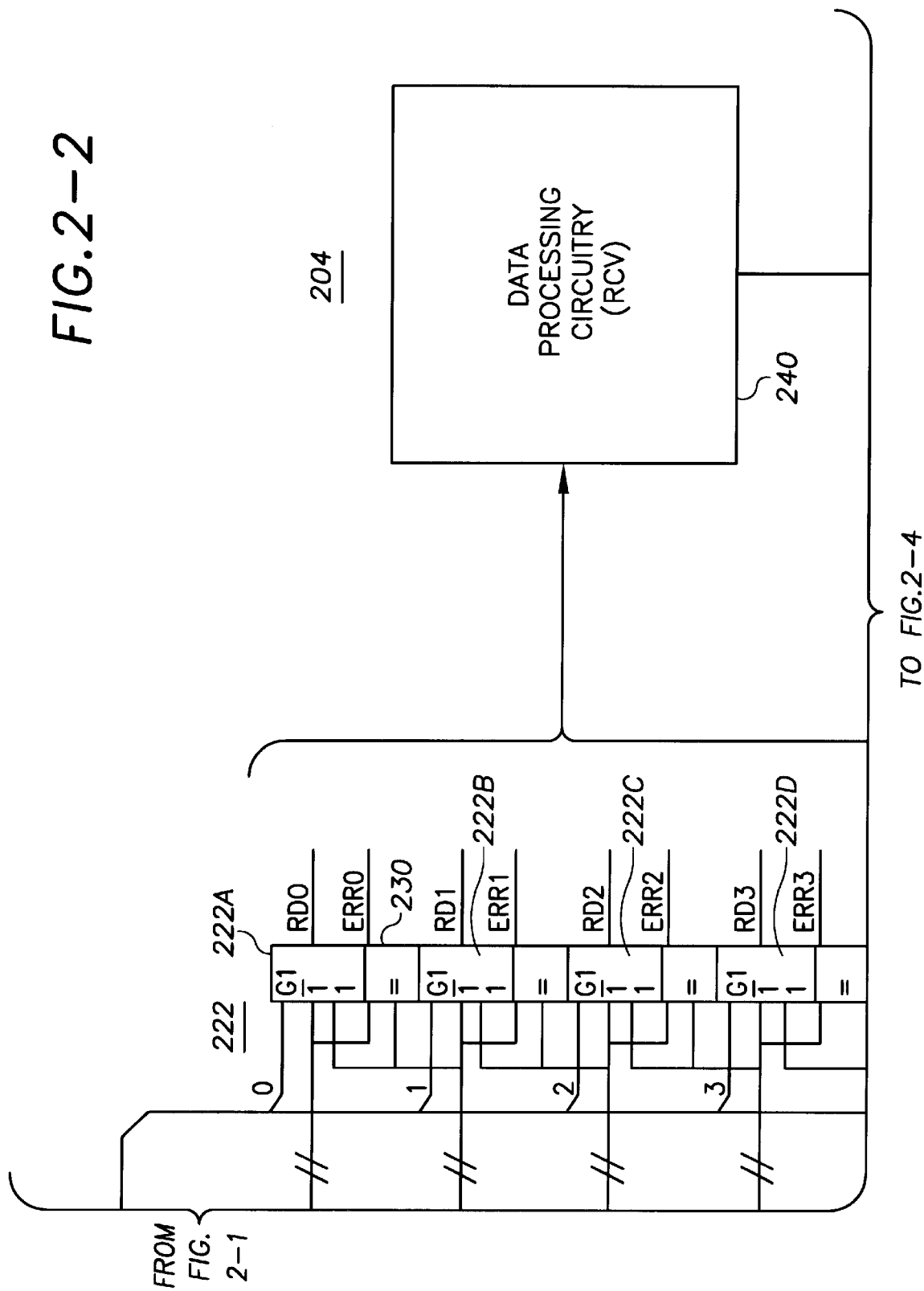

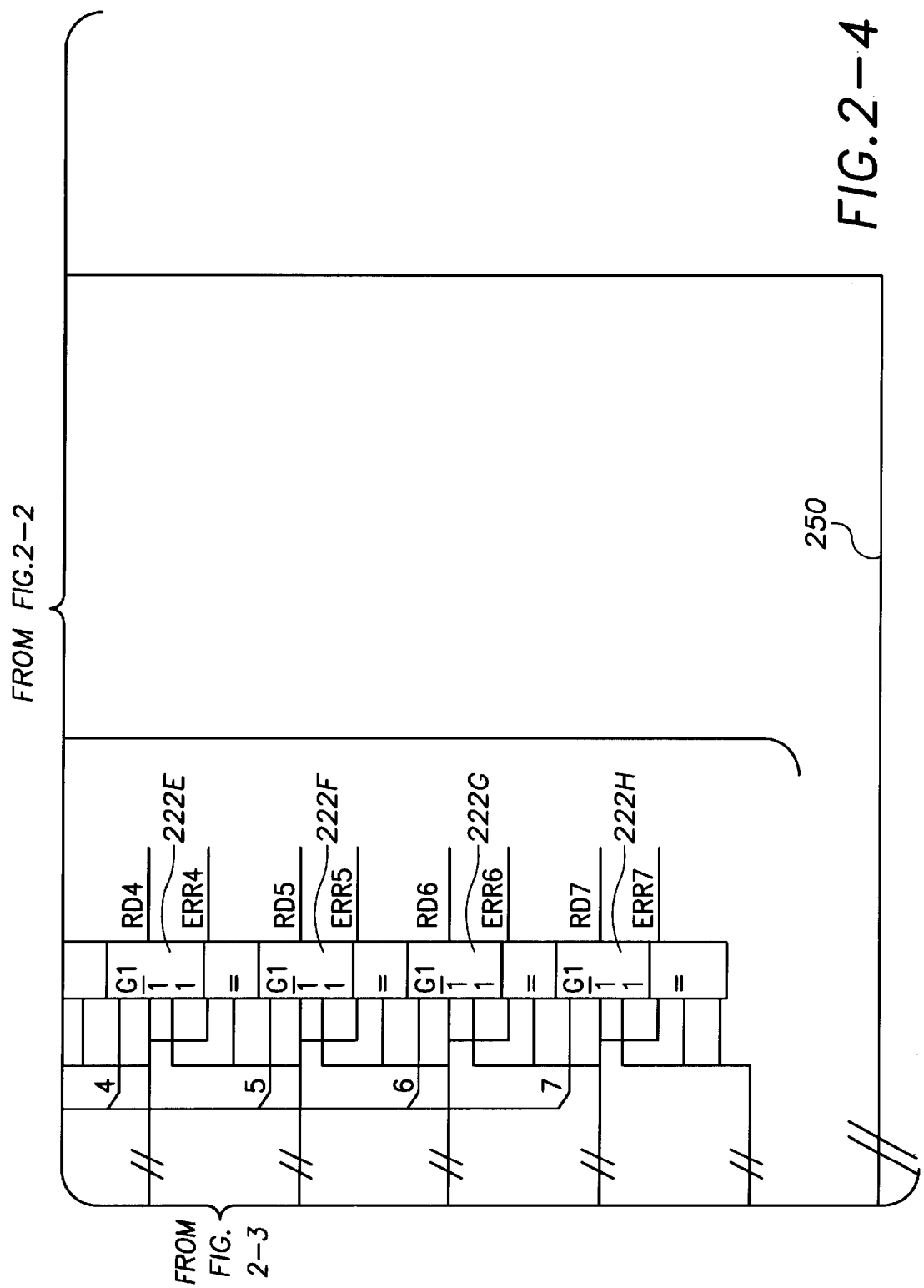

REAL-TIME CHANNEL CALIBRATION METHOD AND ARRANGEMENT

FIELD OF THE INVENTION

The present invention is directed generally to data communication. More particularly, the present invention relates to methods and arrangements for transferring data over parallel data interconnect circuits and to calibrating and overcoming errors caused by skewed data in transfers between nodes.

BACKGROUND OF THE INVENTION

Ongoing demands for more-complex circuits have led to significant achievements that have been realized through the fabrication of very large-scale integration of circuits on small areas of silicon wafer. These complex circuits are often designed as functionally-defined blocks that operate on a sequence of data and then pass that data on for further processing. This communication from such functionally-defined blocks can be passed in small or large amounts of data between individual integrated circuits (or "chips"), within the same chip and between more remotely-located communication circuit arrangements and systems. Regardless of the configuration, the communication typically requires closely-controlled interfaces to insure that data integrity is maintained and that chip-set designs are sensitive to practicable limitations in terms of implementation space and available operating power.

With the increased complexity of circuits, there has been a commensurate demand for increasing the speed at which data is passed between the circuit blocks. Many of these high-speed communication applications can be implemented using parallel data interconnect transmission in which multiple data bits are simultaneously sent across parallel communication paths. Such "parallel bussing" is a well-accepted approach for achieving data transfers at high data rates. For a given data-transmission rate (sometimes established by a clock passed along with the data), the interconnect bandwidth, measured in bits-per-second, is equivalent to the data transmission rate times the number of data signals comprising the parallel data interconnect.

A typical system might include a number of modules (i.e., one or more cooperatively-functioning chips) that interface to and communicate over a parallel data bus, for example, in the form of a cable, other interconnect and/or via an internal bus on a chip. A transmitting module transmits data over the bus synchronously with a clock on the transmitting module. In this manner, the transitions on the parallel signal lines leave the transmitting module in a synchronous relationship to each other and/or to a clock on the transmitting module. At the other end of the parallel data interconnect, the receiving module receives the data on the parallel data bus; where the interconnect passes a clock signal, the receive clock is typically derived from or is synchronous with clock on the transmitting module. The rate at which the data is passed over the parallel signal lines is sometimes referred to as the (parallel) "bus rate."

In such systems, the received signals (and where applicable the receive clock) should have a specific phase relationship with the transmit clock in order to provide proper data recovery. There is often an anticipated amount of time "skew" between the transmitted data signals themselves and between the data signals and the receive clock at the destination. A skew can be caused by a number of phenomena including, for example, transmission delays introduced by the capacitive and inductive loading of the signal lines of the parallel interconnect, variations in the input/output driver source, intersymbol interference and variations in the transmission lines' impedance and length. Regardless of which phenomena cause the skew, the phenomena present a serious integrity issue for the data being communicated and, in many applications, the overall communication system.

While there have been a number of previous approaches to address this skew issue, many of these approaches have required that the signal path be taken out of service to permit a calibration process to be performed. Moreover, some calibration processes are inefficient and require that the channel be taken out of service for a considerable time. Such "downtime" is often unduly expensive and can be intolerable in some applications.

Accordingly, improving data communication over parallel busses permits more practicable and higher-speed parallel bussing applications which, in turn, can directly lead to serving the demands for high-speed circuits while maintaining data integrity in the presence of skew-causing phenomena. Various aspects of the present invention address the above-mentioned deficiencies and also provide for communication methods and arrangements that are useful for other applications as well.

SUMMARY OF THE INVENTION

Various aspects of the present invention are directed to data transfer over parallel-interconnect circuits in a manner that addresses and overcomes the above-mentioned issues. In one example application involving a high-speed data transfer over a parallel data bus, the present invention permits significant increases in the data-transmission rate while maintaining data integrity.

One particular example embodiment of the present invention involves a parallel data communication arrangement in which digital data is transferred in parallel between two communication nodes. The arrangement includes a parallel arrangement of data paths for passing data in parallel between at least two nodes and an additional calibration path for data calibration; and calibration mode circuitry adapted to compare a sequence of data over the calibration path relative to a matched sequence of data being passed on one of the multiple data paths, the calibration mode circuitry also being adapted to adjust a transmission time in response to the comparison According to another example embodiment of the present invention, the parallel data communication arrangement includes a parallel arrangement of M paths for passing concurrently N bits of data in parallel from a first node to a second node, and an additional calibration path for calibrating the data passed in parallel from the first node to the second node, where M is greater than N. Also included are M data drivers respectively coupled to the M paths at the first node and M data receivers respectively coupled to the M paths at the second node. A calibration circuit compares a sequence of data over a selected one of the M paths relative to a matched sequence of data being passed for one of the N bits of data, and the calibration circuit adjusts a transmission time for the selected one of the M bits of data in response to the comparison.

Another important aspect of the present invention is directed to uses of the above-described data paths, including using the additional calibration path for data calibration, wherein the data paths have rotating assignments during calibration. One, of the data paths, or the additional calibration path, is selected for passing the calibration, data while the other paths are used to pass noncalibration data, and then another of the paths is selected for passing the calibration data while the others are used to pass noncalibration data. This rotation of assignments continues with the transmission time being adjusted in response to each comparison.

A more specific aspect of this rotational-assignment implementation involves performing the comparison between immediately adjacent pairs of the data paths. In this manner, the likelihood of accurately reducing skew is maximized.

Certain other embodiments of the present invention are respectively directed to methods implemented in a manner consistent with the above embodiments, to procedures for rotating the calibration procedure through each of the data paths while using the calibration path as a spare path to maintain communication integrity, and to various embodiments for controlling the calibration procedure and for detecting whether the data is skewed.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
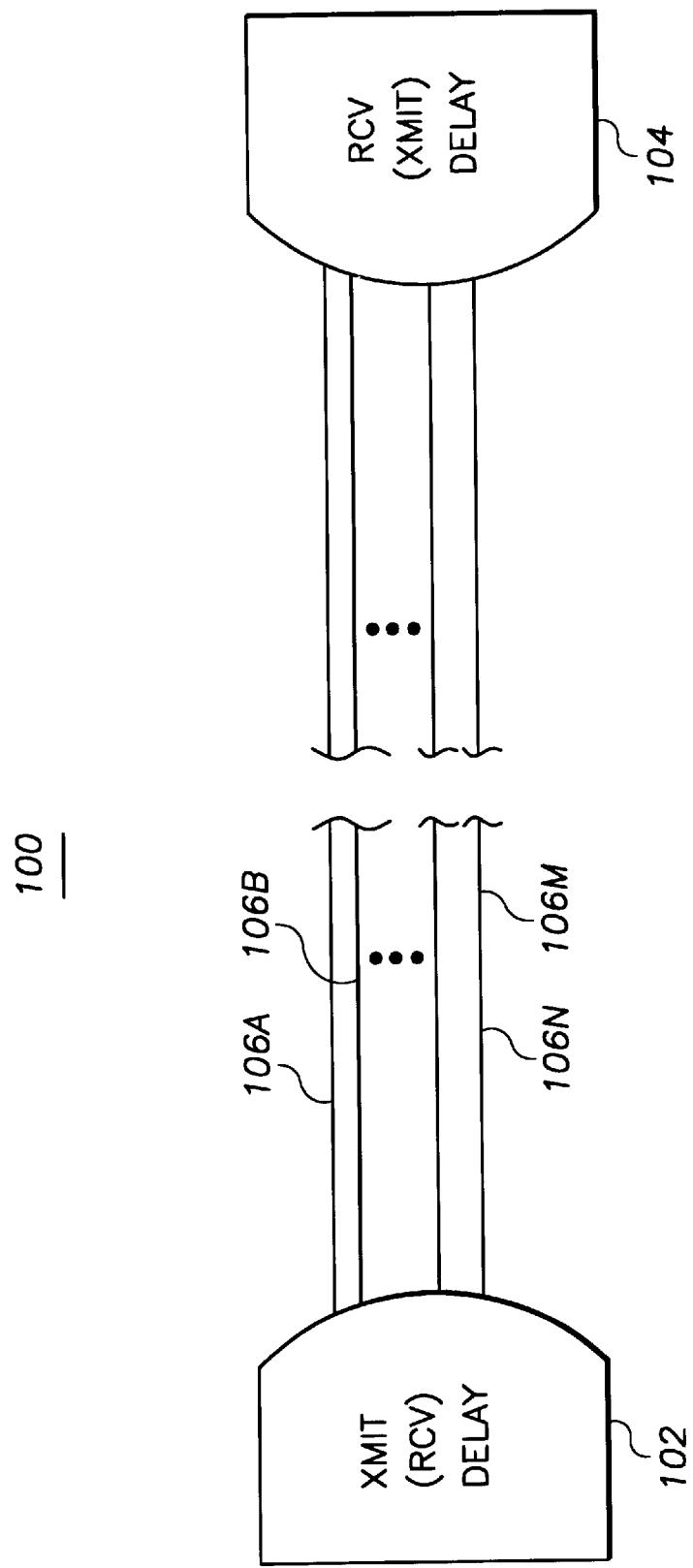
FIG. 1 is a general block diagram of a parallel data communication arrangement including calibration control, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be generally applicable to methods and arrangements for transferring data between two modules intercoupled by a parallel data interconnect circuit. The invention has been found to be particularly advantageous for high-speed data transfer applications benefiting from high data integrity which would otherwise be disadvantaged by the costs of typical skew-inhibiting circuitry and processes; examples of such applications include, among others, extremely high-bandwidth optical networking, SSTL and RSL (rambus signaling logic) interfaces, modules that interface to and communicate over a parallel data bus, in the form of a cable, other interconnect and/or via an internal bus on a chip. Other example applications include telecommunication trunk systems and other networked infrastructures, high-performance server clusters, storage-area networks, and many other high-performance systems. While the present invention is not necessarily limited to such applications, an appreciation of various aspects of the invention is best gained through a discussion of examples in such an environment.

According to one example embodiment of the present invention, a parallel data arrangement passes digital data at a clock rate set by clock signals that are carried along a clock communication path along with data lines as part of the parallel data bus. The arrangement further includes a "calibration" path for calibration of the data paths forming the parallel data bus, and logic and/or processing circuitry adapted to compare a sequence of data over the calibration path relative to a matched sequence of data being passed on one of the multiple paths, and adapted to adjust the transmission time for the one path in response to the comparison.

FIG. 1 illustrates such a parallel data interconnect communication arrangement 100 according to an example embodiment of the present invention. The communication arrangement 100 includes first and second communication nodes (or terminals) 102 and 104 and a parallel set of M paths for passing concurrently N bits of data in parallel. The M paths are depicted in FIG. 1 as 106A, 106B–106M, where M is typically at least one greater than the number of bits (N) being used in the parallel communication. Typically, the arrangement 100 communicates $2^X$ bits of data in parallel with X being equal to at least 2 and with M being slightly greater than $2^X$.

The communication arrangement 100 includes at least one data path more than the depicted N data paths because an additional calibration path is used for calibrating the data passed in parallel from the node 102 to the node 104. Calibration circuitry, associated with one or both nodes 102 and 104, is designed to compare a sequence of data over a selected one (the calibration path) of the M data paths relative to a matched sequence of data being passed (over the noncalibration data path) for one of the N bits of data. In response to detecting that the matched data is skewed beyond a certain tolerance threshold, a transmission time for the noncalibration data path is adjusted so that the data sequences are synchronous to one another. While not a requirement, a typical application realizes optimal calibration by calibrating paths that are immediately adjacent one another. In such an implementation, there is a high likelihood that a skew problem impacting one of the M data paths is also impacting its immediately-adjacent data path(s).

In one example embodiment, this additional calibration path is selectively assigned to act either as a calibration data path for passing calibration data or as one of the data paths for passing a respective one of the N bits of data in parallel. In one application, this selective assignment rotates through each of the M data paths while using the remaining M–1 data paths for passing conventional data (i.e., data unrelated to the calibration).

In another embodiment, one of the M data paths is dedicated to act only as a calibration data path for passing calibration data. This approach is useful where the number of bits (N) is small or where the concern for skewed data is primarily directed at a small group of the M data paths. For example, this situation might arise where one of the M data paths that is more exposed to external conditions is more susceptible to a skew problem.

The parallel data interconnect communication arrangement 100 is depicted in a general block diagram form to illustrate other embodiments and applications. For instance, the communication nodes 102 and 104 can be implemented for simplex or half-duplex communication in either direction, or full-duplex communication where each node 102 and 104 includes circuitry for driving the M data paths as well as decoding data received over the M data paths. Also, one or both of the communication nodes 102 and 104 can be implemented with transmission-time adjustment circuitry for causing a transmission-time delay for one of the M paths relative to the transmission-time for another of the M paths. Similarly, signals for controlling the transmission-time adjustments and/or the selection of calibration path can be controlled from either node. In another example application, where the M data paths are significant in length and include a data-repeater node (not shown in FIG. 1) between the nodes 102 and 104, the transmission-time adjustment circuitry can also be implemented at the data-repeater node (optionally, along with additional signal-control circuitry).

Figures 2, 3:
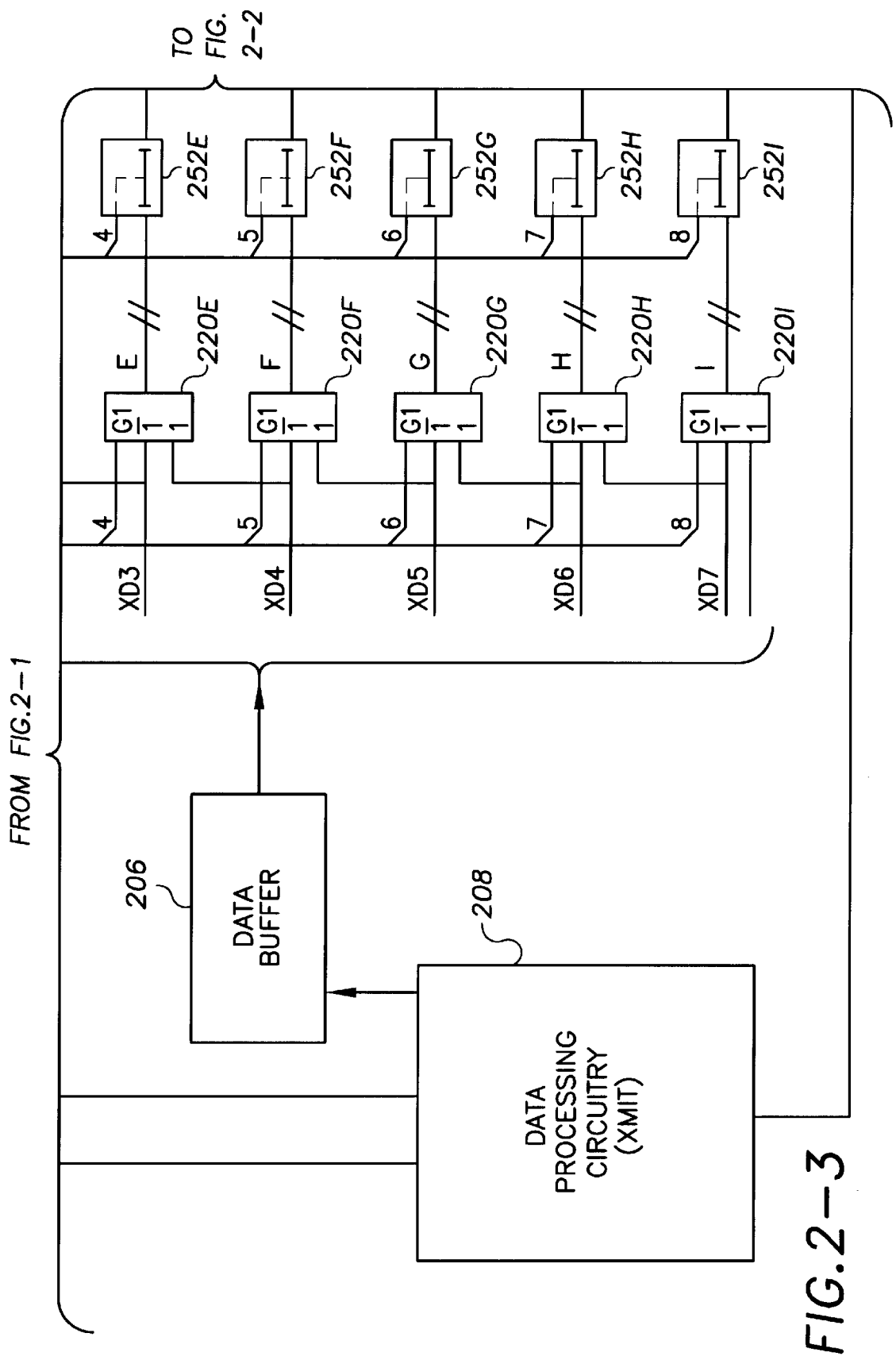
FIG. 2 is a diagram of a more-detailed example embodiment for parallel data communication, according to the present invention.

Also in accordance with the present invention, FIG. 2 illustrates another parallel data interconnect communication arrangement 200. The communication arrangement 200 is a more specific example implementation of the parallel data interconnect communication arrangement 100 of FIG. 1 and is directed to serving an 8-bit parallel data interconnect using 9 data paths for coupling data between a first node 202 and a second node 204. The first node 202 includes several blocks that are depicted functionally for illustrative purposes, including a data buffer 206 adapted to present the 8-bit data for parallel transmission, and data processing circuitry (e.g., having a programmable processor arrangement) 208 adapted to feed the data buffer 206 and perform other tasks relating to the communication between the nodes 202 and 204. These tasks can include commanding select logic 210 to select the next one of the M data paths for which a calibration test is to be performed, receiving feedback data resulting from data-path calibration tests at node 204, and determining the appropriate transmission-time adjustment for calibrating the tested data path and removing skew. The skilled artisan will appreciate that the functionally-depicted blocks 206, 208, 210 and 212 can be implemented using a single chip (such as a CPU, an ASIC and/or other circuit configurations) or as a set of communicatively-coupled circuits; the particular implementation is dependent on the application and the specified communication requirements.

In this example embodiment, select logic 210 selects one of the 9 data paths at a time for performing a calibration test. As shown in FIG. 2, select logic 210 generates two control signals, XSEL 214 and RCVSEL 216, which are used to select the respective data-path driver and data-path receive-buffer to be used in passing calibration data from the node 202 to the node 204. The implementation shown by way of FIG. 2 lends itself to the above-discussed approaches in which the additional calibration path is selectively assigned to act either as a calibration data path for passing calibration data or as one of the data paths for passing a respective one of the N bits of data in parallel. One example approach involves the data processing circuitry 208 activating a calibration mode in which select logic 210 generates the two control signals 214 and 216 so that the redundant data path assignment rotates through each of the 9 data paths, while using the immediately-adjacent data path for calibration comparison.

In this manner, select logic 210 can generate the control signals 214 and 216, respectively, for one of data drivers 220 (e.g., data driver 220A) and the corresponding data-receive buffer 222 (e.g., data-receive buffer 222A) for a corresponding data path "A–I" to act as the first-assigned calibration data path. The 8-data bits are then used conventionally to pass sequences of parallel data from the node 202 to the node 204. With data path "A" assigned to act as the calibration data path, these 8-data bits (or lines) are depicted as XD0≧XD7 respectively feeding data drivers 220B–220I. The data driver 220A is then used to drive the currently-assigned calibration path and is fed with a sequence of data that matches the sequence of data being passed by the data driver 220B. The XSEL signal 214 (9-bits wide) is coupled to the "G1" select port of each data driver 220A–220I for commanding the drivers to pass the data at its "/1" (i.e., bar over "1") input to the driver's output port and to ignore the data at its "1" input. With data path "A" assigned to act as the calibration data path, the data driver 220A sends the calibration data while the data driver 220B sends the matched sequence of data for the XD0 line. At the node 204, the data-receive buffer 222B receives and forwards on the data for the XD0 line, while the data-receive buffer 222A ignores the matching calibration data sequence in response to the RCVSEL signal 216 controlling the "G1" input of the data-receive buffer 222A.

Responsive to the transmission of the matched data sequences, a comparison circuit 230, located between the data-receive buffers 222A and 222B, is used to determine whether or not there is an intolerable skew. Such a skew would be indicated, for example, by the two data sequences failing to correspond at data-transition points. Should an intolerable skew be detected, the comparison circuit 230 generates an error signal. This error signal is then used to adjust the transmission time for one or both of the data paths "A" and "B" so that they are calibrated with no intolerable skew. It will be appreciated that the comparison circuit 230 can be implemented (before or after the receive buffer) as an exclusive-or circuit that compares the two matched data sequences and, with no intolerable skew, outputs only glitches that can be readily filtered using latching circuits or an analog (e.g., RC) low-pass filter, either of which can be designed to ignore glitches indicating a corresponding degree of skew tolerance. Unrelated to parallel-data deskewing, this error-detection approach relates to techniques used in early phase-locked-loop ("PLL") circuits and more recently in FM radios. In another specific example embodiment, the deskewed lines are sampled first and with the sampled results then being "XORed." This alternative approach tends to provide a moderately wide region where there is no difference detected, bounded by transition regions where the sampling mechanism breaks down (e.g., due to setup/hold violations) surrounded by regions where the two sampled lines are off by one and have an average of 50% duty cycle. In this instance, one of the data processing circuits 206 or 240 locates the bounds and sets the line under consideration to the midpoint.

Implementing the error adjustment can be handled in a number of ways. For example, the error signal initially generated by the comparison circuit 230 can be forwarded to the processing logic, such as data processing circuitry 240 at node 204, and then fed back to the node 202 for the time-adjust logic 212. This feedback can be direct from the comparison circuit 230 to the data processing circuitry 208 at node 202 (or the time-adjust logic 212) or, alternatively, can be fed first to the data processing circuitry 240 at node 204 and then to the data processing circuitry 208 at node 202 (or the time-adjust logic 212).

In response to receiving indication that a particular data path requires a transmission-time adjustment, the time adjust logic 212 signals an variable-delay circuit 252A and/or 252B for the corresponding data path to increase or decrease the previously-set delay (if any) introduced by the adjustable delay circuits. The variable-delay circuit can be implemented in various ways including, for example, using a current-starved inverter implemented with its degree of current starvation to be commensurate with the desired degree of delay, or using a chain of selectable logic and/or capacitive elements wherein each such element activated into the chain increases the delay.

Consistent with the above discussion and example implementation involving the calibration-path assignment being rotated, the calibration is completed with data path "A" being used as the calibration path, select logic 210 changes its control signals 214 and 216 so that the next data path "B" is assigned as the calibration path and the XD0 data line is rerouted for normal transmission via data path "A." This rerouting control can be achieved by having each of the XD0–XD7 data lines feeding a pair of the data drivers 220A–220I and using the control signals 214 and 216 to coordinate which of the data paths is to be used for the calibration path. In this example, the next operations in the rerouting involve assigning the XD0 data line to feed the data driver 220A, and the XD1–XD7 data lines to feed the data drivers 220C–220I, respectively. The data driver 220B, which becomes the driver for the assigned calibration path, is fed with a sequence of data that matches the sequence of data being passed by the data driver 220C. At the node 204, the data-receive buffers 222B and 222C process and compare the matching data sequences for calibration purposes, as described above in connection with the calibration process for the data path "A."

Advantageously, in the above example, the calibration testing and recalibration of each data path can occur while the data channels are in use, thereby alleviating the need to interrupt the data transmission between the nodes 202 and 204.

Consistent with the communication arrangement 200 of FIG. 2, the following table illustrates two example of calibration control settings. The variation is based on the fact that each line being deskewed may be compared to either of its two neighbors.

TABLE 1

First Deskew Control Assignment

| Line under test | XSEL | RCVSEL | Error Flag |
|---|---|---|---|
| A | 000000001 | 11111111 | ERR0 |
| B | 000000001 | 11111110 | ERR0 |
| C | 000000011 | 11111100 | ERR1 |
| D | 000000111 | 11111000 | ERR2 |
| E | 000001111 | 11110000 | ERR3 |
| F | 000011111 | 11100000 | ERR4 |
| G | 000111111 | 11000000 | ERR5 |
| H | 001111111 | 10000000 | ERR6 |
| I | 011111111 | 00000000 | ERR7 |

TABLE 2

Alternate Deskew Control Assignment

| Line under test | XSEL | RCVSEL | Error Flag |
|---|---|---|---|
| A | 000000001 | 11111111 | ERR0 |
| B | 000000011 | 11111110 | ERR0 |
| C | 000000111 | 11111100 | ERR1 |
| D | 000001111 | 11111000 | ERR2 |
| B | 000011111 | 11110000 | ERR3 |
| F | 000111111 | 11100000 | ERR4 |
| G | 001111111 | 11000000 | ERR5 |

TABLE 2-continued

Alternate Deskew Control Assignment

| Line under test | XSEL | RCVSEL | Error Flag |
|---|---|---|---|
| H | 011111111 | 10000000 | ERR6 |
| I | 011111111 | 00000000 | ERR7 |

The present invention should not be considered limited to the particular examples described above, but rather should be understood to cover all aspects of the invention as fairly set out in the attached claims. Various modifications, equivalent processes, as well as numerous structures to which the present invention may be considered to fall within the scope of the present invention. For example, certain applications not requiring relatively high-speed performance can be implemented without one or more separate channels (214, 216, 219, 250) for passing the control and/or error feedback signals; rather, this control and/or feedback data can be communicated from one node to the other node, as may be necessary, using the data paths in two-way communication (e.g., the 8-data bits). Further, it will be appreciated that each of the above-described communication nodes typically includes well-known synchronization circuitry for each of the data and calibration signals (i.e., each data path). The claims are intended to cover such alternative approaches.

What is claimed is:

1. A parallel data communication arrangement including circuitry for calibrating data, comprising:

a parallel arrangement of data paths for passing data in parallel between at least two nodes and an additional calibration path for data calibration; and calibration mode circuitry adapted to compare a sequence of data over the calibration path relative to a matched sequence of data being passed on one of the multiple data paths, the calibration mode circuitry also being adapted to adjust a transmission time in response to the comparison.

2. The parallel data communication arrangement of claim 1, wherein a first part of the calibration mode circuitry is located at the first node and a second part of the calibration circuitry is located at the second node, and wherein the calibration mode circuitry and the parallel arrangement of data paths are adapted to selectively use the additional calibration path in one mode for passing calibration data and in another mode for passing noncalibration data.

3. The parallel data communication arrangement of claim 1, wherein the calibration mode circuitry is further adapted, for each of the multiple paths, to compare a sequence of data over the calibration path relative to a matched sequence of data being passed on one of the multiple paths, the calibration mode circuitry adapted to adjust a transmission time for said at least one of the multiple paths in response to the comparison.

4. The parallel data communication arrangement of claim 1, wherein the calibration mode circuitry includes a path-selection circuit adapted to control a calibration sequence for one of the multiple paths.

5. The parallel data communication arrangement of claim 4, wherein the path-selection circuit is adapted to control a calibration sequence for each of the multiple paths.

6. The parallel data communication arrangement of claim 5, further including multiple data drivers, each driver respectively coupled to one of the paths and arranged to communicatively couple data from an input that is selectably coupled as an input to another one of the multiple data drivers.

7. The parallel data communication arrangement of claim 6, further including synchronization circuitry adapted to synchronize the data passing in parallel between the nodes.

8. A parallel data communication arrangement including circuitry for calibrating data, comprising:

a parallel arrangement of M paths for passing concurrently N bits of data in parallel from a first node to a second node, and including an additional calibration path for calibrating the data passed in parallel from the first node to the second node, where M is greater than N;

M data drivers respectively coupled to the M paths at the first node;

M data receivers respectively coupled to the M paths at the second node;

a calibration circuit adapted to compare a sequence of data over a selected one of the M paths relative to a matched sequence of data being passed for one of the N bits of data, the calibration circuit also being adapted to adjust a transmission time in response to the comparison.

9. The parallel data communication arrangement of claim 8, further including a path-selection circuit adapted to control a calibration sequence for one of the M paths.

10. The parallel data communication arrangement of claim 9, wherein the path-selection circuit is adapted to control a calibration sequence for each of the M paths.

11. The parallel data communication arrangement of claim 10, wherein each driver is arranged to communicatively couple data from an input that is selectably coupled as an input to another one of the multiple data drivers.

12. The parallel data communication arrangement of claim 10, wherein each driver is arranged to communicatively couple data from an input that is selectably coupled as an input to another adjacent one of the multiple data drivers, each driver and the adjacent one of the multiple data drivers communicatively coupled to immediately-adjacent ones of the M paths.

13. The parallel data communication arrangement of claim 10, wherein the calibration sequence includes adjusting a transmission time for said one of the M data paths in response to the comparison indicating that the data sent over a selected one of the M paths and the matched sequence of data are skewed beyond an acceptable tolerance.

14. The parallel data communication arrangement of claim 8, wherein the calibration circuit is further adapted to provide an error signal in response to the comparison indicating that the data sent over a selected one of the M paths and the matched sequence of data are skewed beyond an acceptable tolerance.

15. The parallel data communication arrangement of claim 8, further including an exclusive- or circuit adapted to receive and process the data sent over a selected one of the M paths and the matched sequence of data, wherein the calibration circuit is further adapted to provide an error signal in response to data being skewing beyond an acceptable tolerance and, in response, the calibration circuit being further adapted to adjust the transmission time.

16. The parallel data communication arrangement of claim 15, further including a filter coupled to filter the output of the exclusive-or circuit, the filter adapted to provide, as a quality indicator, whether data is skewed beyond the acceptable tolerance.

17. The parallel data communication arrangement of claim 15, wherein the calibration circuit is further adapted to perform the comparison by first sampling the data and then providing the sampled data for processing by the exclusive-or circuit.

18. The parallel data communication arrangement of claim 14, wherein the calibration circuitry includes a path-selection circuit adapted to control a calibration sequence for each of the multiple paths, each of the M data drivers is arranged to communicatively couple data from an input that is selectably coupled as an input to another one of the multiple data drivers, and further including synchronization circuitry adapted to synchronize the data passing in parallel between the nodes.

19. A parallel data communication arrangement including circuitry for calibrating data, comprising:

a parallel arrangement of data paths for passing data in parallel between at least two nodes and an additional calibration path for data calibration;

calibration mode circuitry adapted to compare a sequence of data over the calibration path relative to a matched sequence of data being passed on one of the multiple data paths, the calibration mode circuitry also being adapted to adjust a transmission time for the calibration path in response to the comparison; and control circuitry coupled to the calibration mode circuitry and the parallel arrangement of data paths, the control circuitry being adapted to alternatively rotate assignments for each of the parallel arrangement of data paths and the additional calibration path, wherein during each of the assignments, calibration data is passed on a selected one of the parallel arrangement of data paths and the additional calibration path.

20. The parallel data communication arrangement of claim 19, wherein the control circuitry and the calibration mode circuitry are configured and arranged to cause comparison between immediately adjacent pairs of the parallel arrangement of data paths and the additional calibration path.

21. A parallel data communication arrangement having a parallel arrangement of data paths for passing data in parallel between at least two nodes, comprising:

a calibration path for data calibration;

means for comparing a sequence of data over the calibration path relative to a matched sequence of data being passed on one of the multiple paths; and means, responsive to the comparison, for adjusting the transmission time for the calibration path.

22. A method of parallel data communication for a circuit arrangement including a parallel arrangement of data paths for passing data in parallel between at least two nodes, comprising:

providing a calibration path for data calibration;

comparing a sequence of data over the calibration path relative to a matched sequence of data being passed on one of the multiple paths; and adjusting the transmission time for the calibration path in response to the comparison.

23. The method of claim 22, further including rotating assignments for each of the parallel arrangement of data paths and the additional calibration path, wherein during each of the assignments, calibration data is passed on a selected one of the parallel arrangement of data paths and the additional calibration path.

24. The method of claim 23, wherein the comparison is performed between immediately adjacent pairs of the parallel arrangement of data paths and the additional calibration path.

* * * * *